Patented Oct. 17, 1933

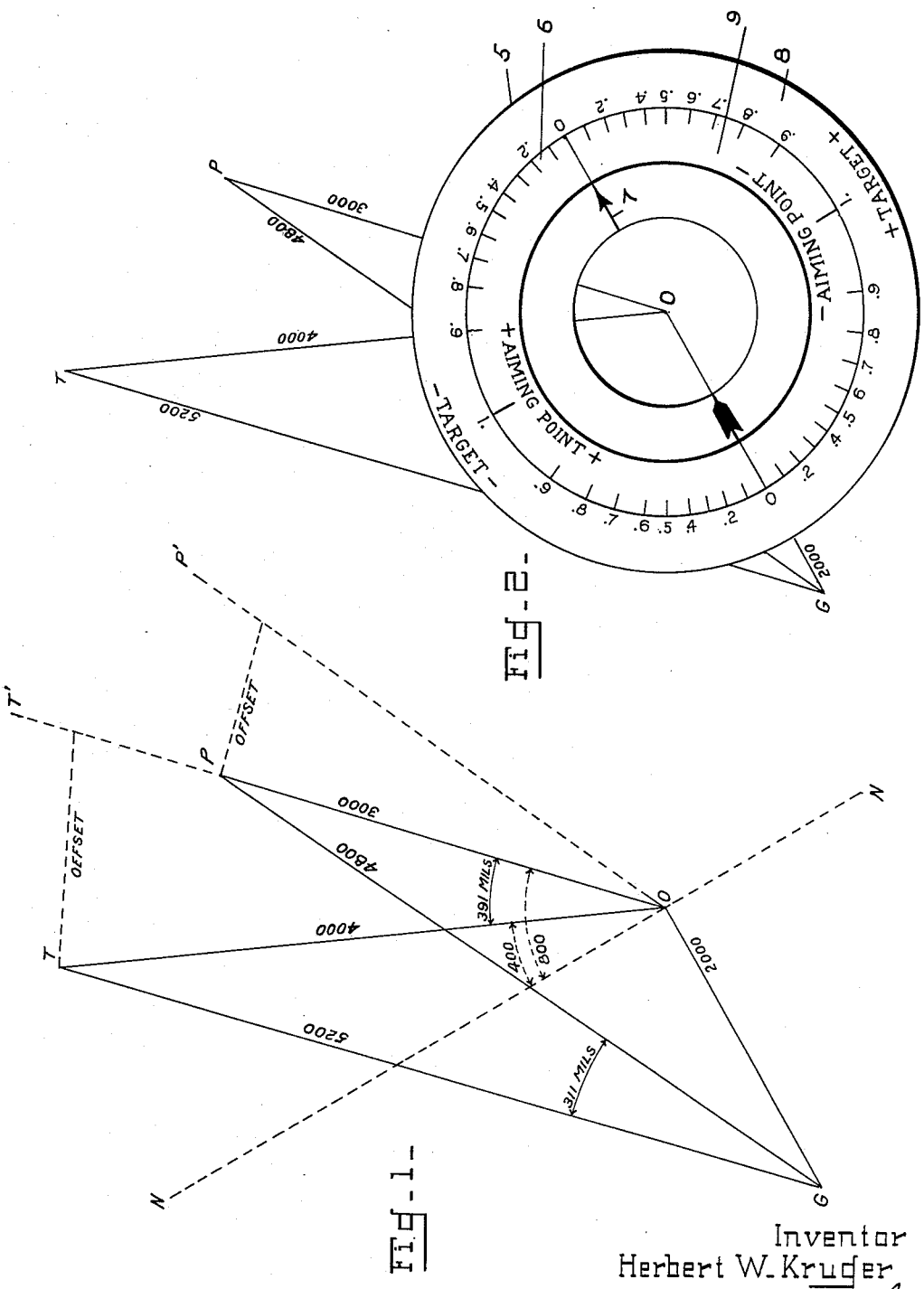

1,930,481

UNITED STATES PATENT OFFICE 1,930,481

DATA COMPUTER

Herbert W. Kruger, United States Army, Portland, Oreg.

Application October 28, 1932. Serial No. 640,055

2 Claims. (Cl. 235—61)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a data computer and more particularly it has reference to a device for determining certain artillery firing data.

The purpose of the invention is to provide a computer which when employed at an observation post will automatically give the obliquity factor as required in the parallel method of calculating the firing angle for a gun.

A preferred embodiment of the invention is illustrated in the accompanying drawing in which, Fig. 1 is a diagrammatic view showing the problem to be solved and Fig. 2 is a plan view of the computer showing its manner of application.

In the parallel method of calculating the firing angle, the angle from the target to the aiming point is measured clockwise at the observation post. By adding or subtracting from this angle the parallaxes at the target and aiming point for the base line observation post-gun, the value of the firing angle for the gun is obtained. If the target or aiming point are not near the normal to the base line the amount of the deviation must be taken into consideration in computing the parallax. This deviation from the normal is known as the change in parallax due to obliquity and the factors of the obliquity are the natural cosines of the angles.

In the example shown in Fig. 1, O is the position of the observation post; G is the position of the gun; T is the position of the target; P is the position of the aiming point. The above points are joined by straight lines. The dotted lines OT' and OP' respectively parallel to the lines OT and OP afford an indication of the direction of the offsets TT' and PP'. If the offset (TT') falls within or partly within the angle TOP the parallax is subtractive, while if it (PP') falls without the measured angle it is additive.

The parallax T or P is equal to the distance OG divided by the range GT or GP in thousands of yards, and multiplied by the obliquity factor. The distance OG as measured by range finder is 2000 yards, OT is 4000 yards, and OP is 3000 yards. Estimated range GT is 5200 and estimated range GP is 4800. In the usual case it is sufficiently exact in computing the divisor to take the nearest multiple of 500 yards. The deviation of the lines OT and OP from the normal N—N are respectively 400 and 800 mils in approximate measurements. The natural cosines for the angles 400 and 800 are .9 and .7.

$$\text{Parallax T in mils} = OG \times .9$$
$$= \frac{2000}{5} \times .9 = -360$$

The offset TT' is within the angle TOP and the sign is minus.

$$\text{Parallax P in mils} = \frac{OG}{GP} \times .7$$
$$= \frac{2000}{5} \times .7 = +280$$

The offset PP' is without the angle TOP and the signs is plus.

The algebraic sum of the parallaxes is —80.
The measured angle TOP is 391 mils.
The angle TGP=TOP±T±P=311 mils.

Referring now to Fig. 2, the present invention consists of a device whereby the obliquity factor and the sign of the parallax angle may be readily determined at the observation post. The device is in the form of a disc or ring 5 adapted to be mounted on the battery commanders telescope at the observation point. Extending about the disc is a scale 6 plotted in functions of the natural cosines of the angles. The base line 7 is indicated by an arrow and is provided for purpose of orientation.

One half of the disc bears the indicia "+ target" and "− aiming point" while in the opposite half the signs are reversed and the legend reads "− target" and "+ aiming point". The word "target" preferably appears in the outer band 8 and the words "aiming point" appear in the inner band 9. In order to facilitate reading of the chart, the plus and the minus portions of the bands are in contrasting colors.

In operation the disc is fixed on the telescope at the observation post with its base line 7 coincident with the line OG observation point—Gun, and the arrow pointing away from the gun position. The telescope when directed at the target gives a reading of −.9 and when directed at the aiming point gives a reading of +.7. These values are the cosines of the angles of the line OT and OP from the normal and are to be used as the multiplier in the equation developed with reference to Fig. 1.

It will be noted in the operation described that the readings are taken from the scales on the side towards the target and aiming point. Where it is desired to take the readings from the opposite side of the disc, the disc is oriented with the arrow pointing towards G and the readings are taken by prolonging PO and TO.

I claim:

1. In a computing device, a plate having an orienting base line and a circular scale plotted in functions of the natural cosines, a band outlined on each side of the circular scale, the bands on one side of the base line inscribed with designations of plus target and minus aiming point, the bands on the other side of the base line inscribed with designations of minus target and plus aiming point.

2. In a computing device, a plate having an orienting base line and a circular scale plotted in functions of the natural cosines, and data on each side of the base line indicating the sign of parallaxes for target and aiming point.

HERBERT W. KRUGER.